US005520431A

United States Patent [19]
Kapes et al.

[11] Patent Number: 5,520,431
[45] Date of Patent: May 28, 1996

[54] FUEL DOOR/SLIDING DOOR INTERLOCK MECHANISM

[75] Inventors: Richard C. Kapes, Shelby Township, Mich.; Raymon Hamp, Oxford, England

[73] Assignee: Chrysler Corporation, Auburn Hills, Mich.

[21] Appl. No.: 368,289

[22] Filed: Jan. 4, 1995

[51] Int. Cl.[6] .................................................. B62D 25/00
[52] U.S. Cl. ............... 296/97.22; 296/155; 292/DIG. 46
[58] Field of Search ................................ 296/97.22, 155; 49/68; 292/336, DIG. 46

[56] References Cited

U.S. PATENT DOCUMENTS 4,492,395  1/1985  Yamada ................................. 292/216
4,620,744  11/1986  Yui et al. .............................. 296/155
5,454,618  10/1995  Sullivan .............................. 296/97.22

*Primary Examiner*—Gary C. Hoge
*Attorney, Agent, or Firm*—Thomas G. Pasternak

[57] ABSTRACT

A vehicle fuel door and sliding side door interlock mechanism to prevent the sliding side door from being opened when the fuel door is open. The interlock includes a latch mechanism mounted on the pillar, a striker secured to the rear edge for closing and opening cooperation with the latch mechanism, an arm secured to the fuel inlet door, a blocking lever operatively connected to the latch mechanism adaptable to block the operation of the latch mechanism, and a linkage operatively connected between the arm and the blocking lever for actuating the blocking lever to prevent the latch mechanism from being opened past the striker and, thereby, prevent the side door from being opened when the fuel inlet door is open.

7 Claims, 4 Drawing Sheets

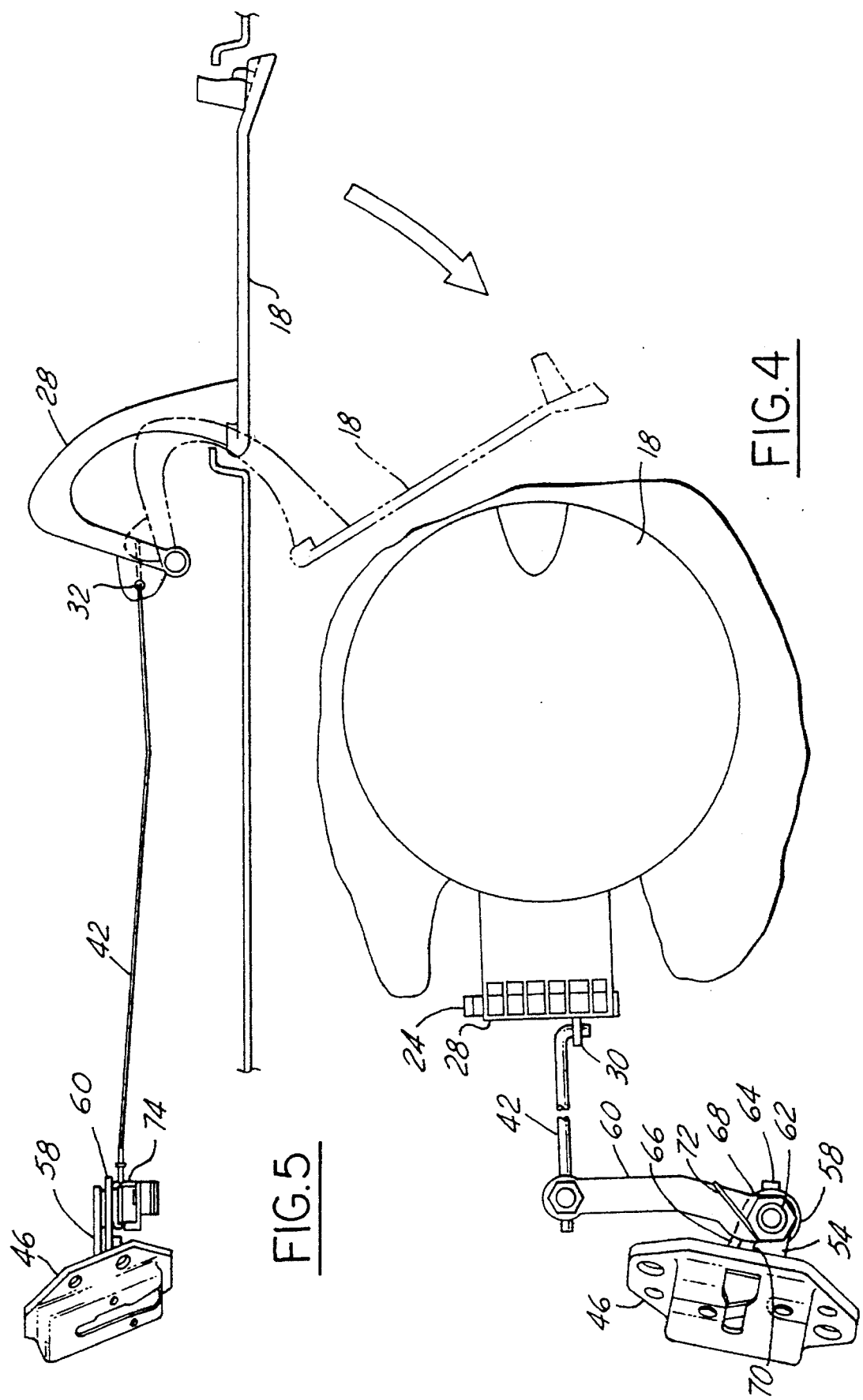

500,431

FUEL DOOR/SLIDING DOOR INTERLOCK MECHANISM

TECHNICAL FIELD

This invention relates generally to interlock mechanisms and, more particularly, to an interlock mechanism operative between a vehicle sliding side door and an adjacent fuel door.

BACKGROUND ART

Yui et al U.S. Pat. No. 4,620,744 discloses a slide door locking device for preventing the door from being opened during feeding of fuel to a fuel tank positioned near the slide door. The device includes an actuating lever positioned inside a fuel lid when the latter is closed. Pulling the actuating lever out, to feed fuel to the fuel tank, serves, through a rod, to pivot a stopper lever to engage a stop member on the slide door should an attempt be made to open the latter by mistake or oversight, thus preventing the door from being opened.

Yamada Pat. U.S. Pat. No. 4,492,395 discloses a vehicle door locking mechanism for preventing a door from being opened by either the inside or outside handles, including a window sill knob N which, through a bell crank and link, rotates a locking lever to displace a link and, thereby, shift a pin into a locked position in registered slots. The patent further discloses a childproofing mechanism including a hand lever which, through a link, slides a pin into a slot such that the pin then does not transmit the motion of an inside release lever to an outside release lever, rendering the door unopenable by the inside handle.

DISCLOSURE OF THE INVENTION

A general object of the invention is to provide an improved interlock mechanism between a vehicle side door and an adjacent fuel inlet door to prevent the former from being opened when the latter is open.

Another object of the invention is to provide an improved interlock mechanism between a vehicle sliding side door and an adjacent fuel inlet door wherein the fuel inlet door serves as an actuating lever of the mechanism.

A further object of the invention is to provide an interlock mechanism between a vehicle sliding side door and an adjacent fuel inlet door, including a latch mechanism mounted on the pillar, a striker secured to the rear edge for closing and opening cooperation with the latch mechanism, an arm secured to the fuel inlet door, a blocking lever operatively connected to the latch mechanism adaptable to block the operation of the latch mechanism, and linkage means operatively connected between the arm and the blocking lever for actuating the blocking lever to prevent the latch mechanism from being opened past the striker and, thereby, prevent the side door from being opened when the fuel inlet door is open.

These and other objects and advantages will become more apparent when reference is made to the following drawings and the accompanying description.

BRIEF DESCRIPTION OF THE DRAWINGS

FIG. 3 is a fragmentary view of a portion of the FIG. 2 structure;

FIG. 4 is a side elevational view of the invention, with the vehicle body removed;

FIG. 5 is a top view of the FIG. 4 structure, shown relative to the vehicle body.

BEST MODE FOR CARRYING OUT THE INVENTION

Figure 1:
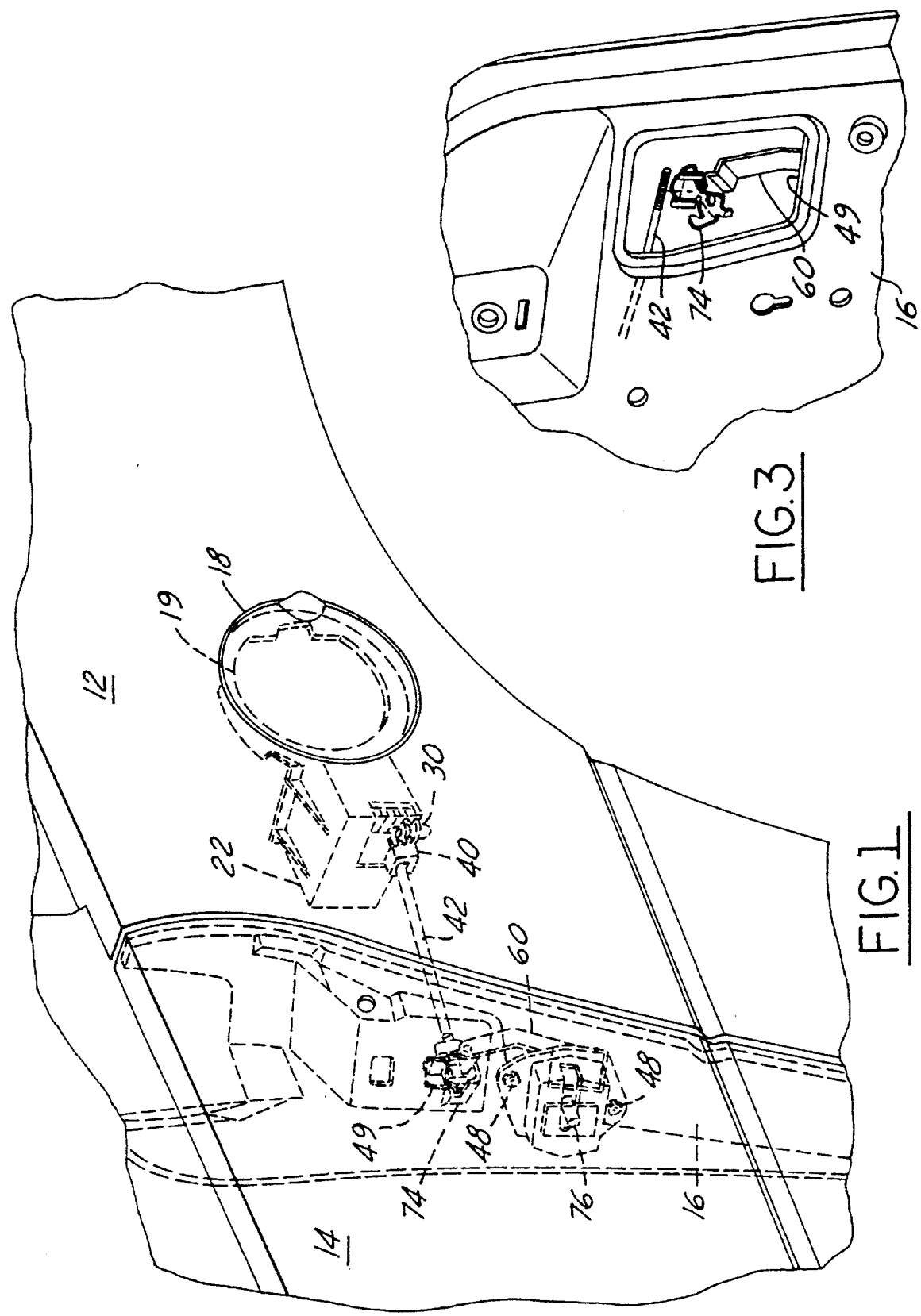
FIG. 1 is a fragmentary perspective view of a vehicle body and sliding side door embodying the invention.
Figure 2:
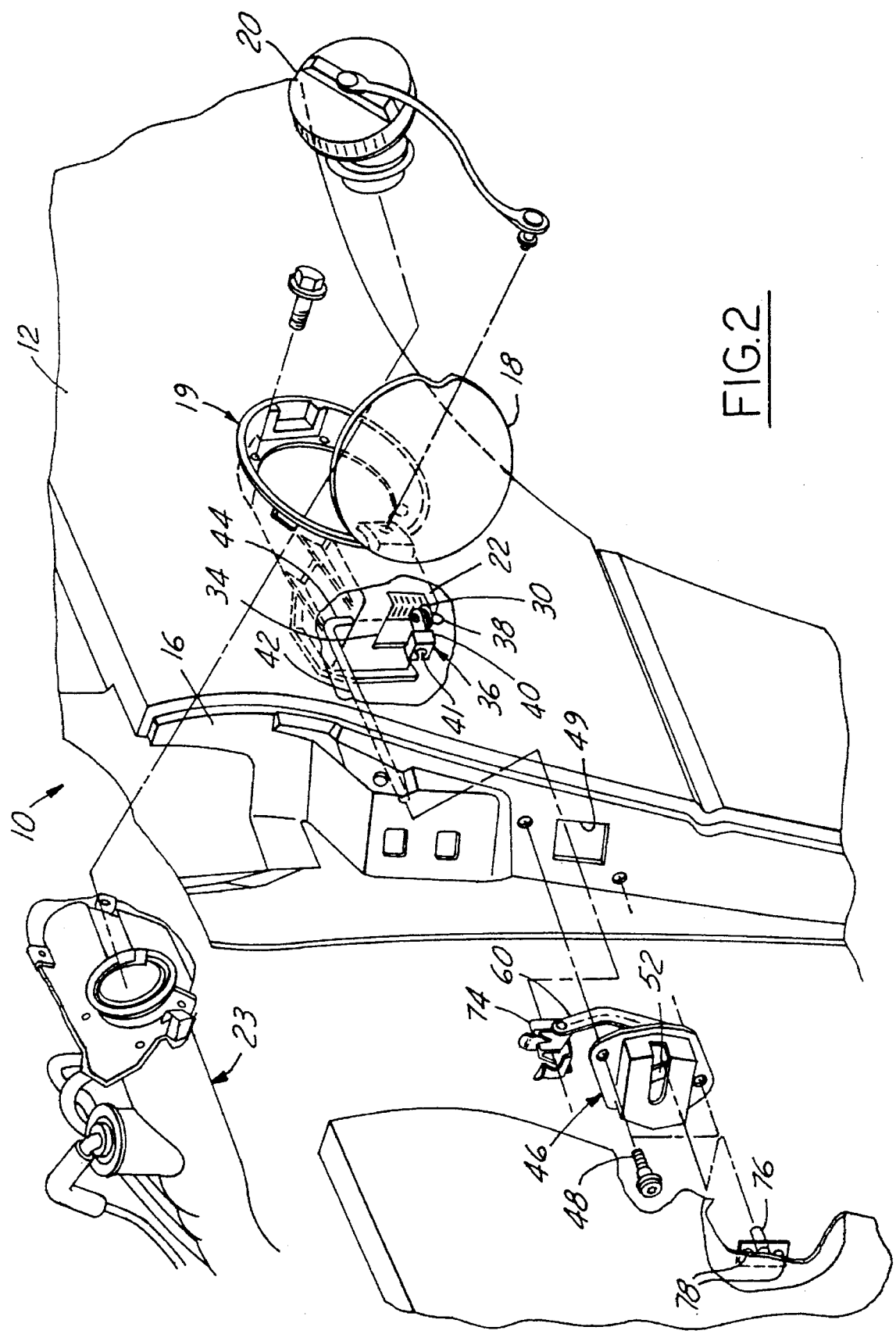
FIG. 2 is a view similar to FIG. 1, showing the component parts thereof in an exploded condition for a left side vehicle door.
Figure 6:
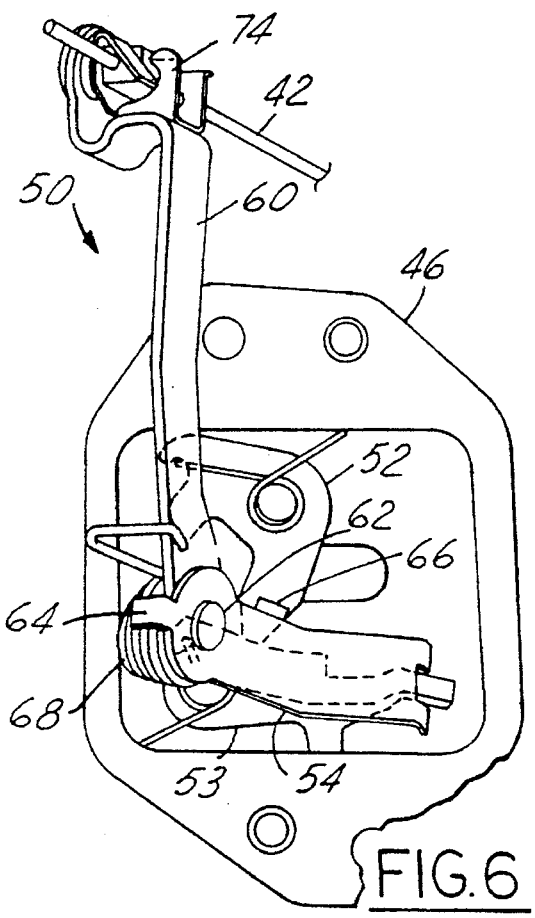
FIGS. 6–9 are side elevational views of the latch portion of the FIG. 1 structure, in different operational positions with some structural elements removed for clarity.
Figure 7:
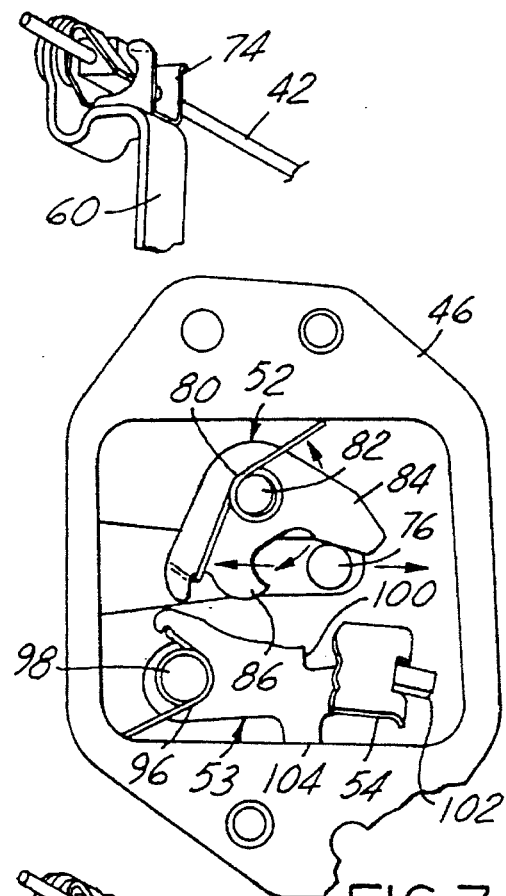
Figure 8:
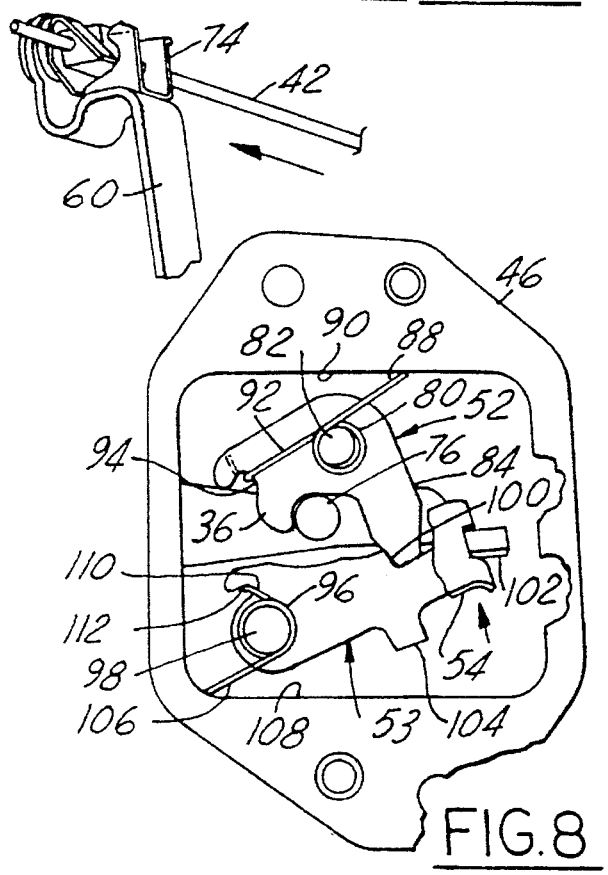

Referring now to the drawings in greater detail, FIGS. 1 and 2 illustrate a vehicle body 10 including a rear exterior side panel 12 and a side sliding door 14 closed in FIG. 1 against a pillar 16 on the forward edge of the panel. A spring-loaded fuel inlet door 18 is pivotally mounted on the panel 12, covering a conventional filler tube housing ring assembly 19 and cap 20. A housing 22 is secured to a tube assembly 23 inside the panel 12. The fuel door 18 is pivotally connected at an edge of the housing 22 and the housing ring assembly 19 by a pivot pin 24 (FIGS. 4 and 5) adapted to pivot the fuel door 18 outwardly.

A U-shaped connector arm 28 (FIG. 5) is secured at one end thereof to the fuel door 18 and then extended through the housing 22. An ear 30 having a hole 32 formed therethrough is secured at the other end of the connector arm 28, shown in FIGS. 1 and 2 extending through an enlarged opening 34 formed in a forward corner of the housing 22.

A retainer unit 36 is formed to include a hollow extension 38 adapted to extend downwardly through the hole 32, and a clamp portion 40 having a slit 41 in one end thereof. The clamp portion 40 is adapted to mount around a rod 42 via the slit 41. A bent end portion 44 on the rod 42 is adapted to be inserted into the hollow extension 38 to become pivotally connected to the ear 30 on the connector arm 28.

A latch enclosure 46 is secured by screws 48 (FIG. 1) to the pillar 16, over an opening 49 in the pillar. As shown in FIGS. 6–9, a latch mechanism 50 includes generally a spring-loaded substantially U-shaped ratchet 52 pivotally mounted in the enclosure 46. A spring-loaded pawl 53 is also pivotally mounted in the enclosure 46 adjacent the ratchet 52.

An actuating lever 60 and a blocking lever 54 are each pivotally mounted on a mounting stud 62 secured on the distal end of a fixed bracket 58, which is secured to the back of latch enclosure 46. A lateral stop lug 64 and a vertical stop lug 66 are formed on the blocking lever 54, with the actuating lever 60 extending therebetween. A coil spring 68 is mounted around the stud 62 with one extended end 70 abutted against the vertical stop lug 66, and the other extended end 72 connected to an edge of the actuating lever 60 adjacent the lateral stop lug 64, for normally urging the lever 60 into engagement with the vertical lug 66. A clip 74 is pivotally connected to the free end of the actuating lever 60.

The rod 42 extends inside the side panel 12 from the ear 30 to be pivotally connected at its distal end to the clip 74.

A striker 76 is secured by fasteners, represented as 78 in FIG. 2, to the rear edge of the door 14.

As shown structurally in FIGS. 6–9, a first coil spring 80 is mounted around a mounting stud 82 on which the U-shaped ratchet 52 is pivotally mounted. The ratchet 52 includes legs 84 and 86. One extended end 88 of the spring 80 abuts against a wall 90 of the enclosure 46, and the other extended end 92 of the spring 80 engages a notch 94 formed in the ratchet 52 adjacent the leg 86. A second coil spring 96 is mounted around a mounting stud 98 on which the pawl 53 is pivotally mounted. The pawl 53 includes a step 100 formed on an edge thereof, a terminal extension 102, and an abutment 104 formed on an opposite edge thereof. One extended end 106 of the spring 96 abuts against a wall 108 of the enclosure 46, and the other extended end 110 engages a notch 112 formed in the pawl 53, urging the abutment 104 against the wall 108.

Figure 9:
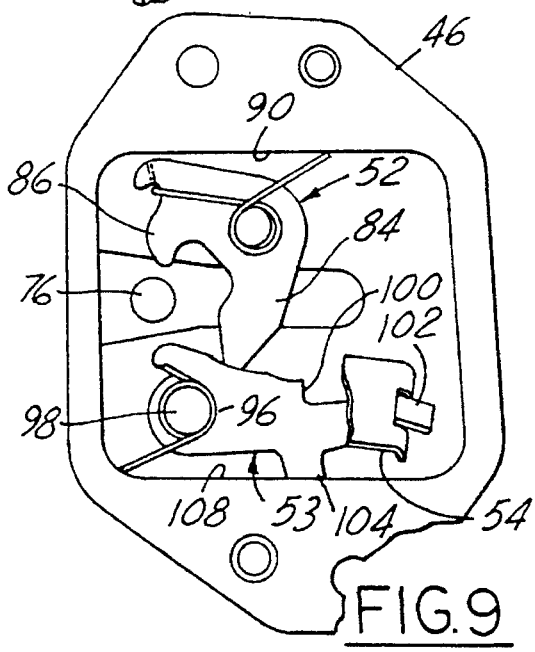

In operation, with the fuel door 18 closed, when the side door 14 is closed, the leg of the spring-loaded ratchet 52 is pivoted in the normal manner (FIG. 7) against the force of the spring upon contact with the striker 76 to cause the leg to engage the striker in conjunction until the door 14 is opened (FIG. 9).

With the side door 14 closed, when the fuel door 18 is opened (FIG. 5 in phantom), such as to permit the entry of a typical fuel nozzle (not shown) therethrough into the tube assembly 23 upon removal of the filler cap 20, the fuel door 18 serves as a lever which is operative to prevent the ratchet 52 from being pivoted away from the striker 76 in the following manner.

Opening the fuel door 18 pivots the U-shaped connector arm 28 and the housing 22 outwardly, pulling the bent end portion 44 of the rod 42 through the opening 34. This action pulls the actuating lever 60 rearwardly, causing its lower end portion to abut against the lateral stop lug 64, pivoting the other end of the blocking lever 54 upwardly (FIG. 8) within the latch enclosure 46 against the terminal extension 102 to, thereby, pivot the pawl 53 upwardly, against the force of the spring 96, causing the step 100 to interfere with (FIG. 8) the leg 84 of the U-shaped ratchet 52, thereby blocking the other leg 86 of the ratchet 52 from pivoting away from the striker 76 if any attempt is made to open the side door 14.

Closing the fuel inlet door 18 once again releases the actuating lever 60, which is returned to its inactive position by the spring 68, freeing the blocking lever 54 from the pawl 53, permitting the ratchet 52 to once again be pivoted by the spring 80 away from the striker 76, to allow the side door 18 to be opened.

INDUSTRIAL APPLICABILITY

It should be apparent that the invention provides a simplified, compact, and efficient interlock mechanism between a fuel inlet door and an adjacent vehicle side door, wherein the fuel inlet door is used to actuate the interlock mechanism.

It should be further apparent that either left-hand or right-hand versions of the invention may be incorporated within either the left or right side panel, respectively, of the vehicle, depending upon which side thereof the fuel inlet is located.

While but one embodiment of the invention has been shown and described, other modifications thereof are possible within the scope of the following claims.

What is claimed is:

1. On a vehicle having a side door, an interlock mechanism operative between a fuel inlet door and a pillar adjacent a rear edge of the side door, the interlock mechanism comprising a latch mechanism mounted on the pillar, a striker secured to said rear edge for closing and opening cooperation with said latch mechanism, an arm secured to said fuel inlet door, a blocking lever operatively connected to said latch mechanism adaptable to block the operation of said latch mechanism, and linkage means operatively connected between said arm and said blocking lever for actuating said blocking lever to prevent said latch mechanism from being opened past said striker and, thereby, prevent said side door from being opened when said fuel inlet door is open.

2. The interlock mechanism described in claim 1, wherein said linkage means comprises a rod pivotally connected at one end thereof to said arm, an actuating lever operatively connected to said blocking lever, and said rod being pivotally connected at the other end thereof to said actuating lever for pivoting said actuating lever to thereby pivot said blocking lever into an interference relationship with said latch mechanism to prevent its release from said striker upon the opening of said fuel inlet door.

3. The interlock mechanism described in claim 2, wherein said arm is substantially U-shaped, with one end thereof secured to said fuel inlet door for rotation therewith, a perforated ear secured to the other end of said U-shaped arm, and a bent end formed on said one end of said rod and pivotally connected to said perforated ear.

4. The interlock mechanism described in claim 2, and spaced stop lugs formed on said blocking lever, wherein said actuating lever is pivotally connected to said blocking lever intermediate said stop lugs, and a spring connected between one of said stop lugs and said actuating lever, said actuating lever being pivoted by the opening of said fuel inlet door against the force of said spring to abut against the other stop lug to pivot said blocking lever into said interference relationship.

5. The interlock mechanism described in claim 1, wherein said latch mechanism includes a pivotally mounted spring-loaded pawl and a pivotally mounted spring-loaded ratchet adapted to be operatively interconnected upon said slider engaging said ratchet when said fuel filler door is open.

6. The interlock mechanism described in claim 5, wherein said blocking lever is adapted to engage said pawl to pivot it into an interference relationship with said ratchet to thereby prevent the ratchet from pivoting away from said striker.

7. On a vehicle having a sliding side door, an interlock mechanism operative between a fuel inlet door and a pillar adjacent a rear edge of the sliding side door, the interlock mechanism comprising a latch mechanism mounted on the pillar, the latch mechanism including a spring-loaded ratchet and a spring-loaded pawl, a striker secured to said rear edge for closing and opening cooperation with said ratchet, a contoured arm secured to said fuel inlet door, a blocking lever adapted to at times pivot said pawl to thereby block the operation of said ratchet, and linkage means operatively connected between said arm and said blocking lever for actuating said blocking lever to prevent said ratchet from being opened past said striker and, thereby, prevent said sliding side door from being opened when said fuel inlet door is open, wherein said linkage means includes a rod pivotally connected at one end thereof to said contoured arm, an actuating lever operatively connected to said blocking lever, and said rod being pivotally connected at the other end thereof to said actuating lever for pivoting said actuating lever to thereby pivot said blocking lever and cause said pawl to assume an interference relationship with said ratchet upon the opening of said fuel inlet door, and spaced stop lugs formed on said blocking lever, wherein said actuating lever is pivotally connected to said blocking lever intermediate said stop lugs, and a spring connected between one of said stop lugs and said actuating lever, said actuating lever being pivoted by the opening of said fuel inlet door against the force of said spring to abut against the other stop lug to pivot said blocking lever into said interference relationship.

* * * * *